(12) United States Patent
Bruesewitz et al.

(10) Patent No.: US 7,809,650 B2
(45) Date of Patent: Oct. 5, 2010

(54) METHOD AND SYSTEM FOR PROVIDING RISK INFORMATION IN CONNECTION WITH TRANSACTION PROCESSING

(75) Inventors: Belva J. Bruesewitz, Danville, CA (US); Nancy Hilgers, Danville, CA (US); Patrick Faith, Pleasanton, CA (US); Kevin Siegel, Milpitas, CA (US); Xiaoli Li, Cupertino, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 1175 days.

(21) Appl. No.: 10/863,813

(22) Filed: Jun. 7, 2004

(65) Prior Publication Data

US 2005/0149455 A1 Jul. 7, 2005

Related U.S. Application Data

(60) Provisional application No. 60/484,547, filed on Jul. 1, 2003.

(51) Int. Cl.
G06Q 20/00 (2006.01)
G06F 7/04 (2006.01)
G06F 17/30 (2006.01)
H04N 7/16 (2006.01)

(52) U.S. Cl. ............... 705/64; 726/2; 726/26; 726/27

(58) Field of Classification Search ............ 705/1–22, 705/25–45, 50–79; 726/2, 26, 27
See application file for complete search history.

(56) References Cited

U.S. PATENT DOCUMENTS

| | | | | |
|---|---|---|---|---|
| 5,386,458 A * | 1/1995 | Nair et al. | ............... | 379/91.01 |
| 5,819,226 A * | 10/1998 | Gopinathan et al. | ........... | 705/44 |
| 5,943,424 A * | 8/1999 | Berger et al. | ............ | 705/64 |
| 6,002,767 A * | 12/1999 | Kramer | ............. | 705/79 |
| 6,018,723 A * | 1/2000 | Siegel et al. | ............. | 705/38 |
| 6,254,000 B1 | 7/2001 | Degen et al. | | |
| 7,096,192 B1 * | 8/2006 | Pettitt | ............. | 705/26 |
| 2002/0091646 A1 | 7/2002 | Lake et al. | | |
| 2002/0099649 A1 * | 7/2002 | Lee et al. | ............. | 705/38 |
| 2002/0139837 A1 * | 10/2002 | Spitz et al. | ............. | 235/375 |
| 2002/0194119 A1 * | 12/2002 | Wright et al. | ............. | 705/38 |
| 2003/0028481 A1 | 2/2003 | Flitcroft et al. | | |
| 2003/0097294 A1 * | 5/2003 | Gordon | ............. | 705/10 |
| 2003/0097320 A1 * | 5/2003 | Gordon | ............. | 705/35 |
| 2003/0105658 A1 * | 6/2003 | Chen et al. | ............. | 705/10 |
| 2003/0140007 A1 * | 7/2003 | Kramer et al. | ............. | 705/40 |
| 2003/0174823 A1 * | 9/2003 | Justice et al. | ............. | 379/145 |
| 2003/0187765 A1 * | 10/2003 | Sgaraglio | ............. | 705/35 |
| 2004/0078340 A1 * | 4/2004 | Evans | ............. | 705/64 |
| 2005/0154632 A1 * | 7/2005 | Lambert et al. | ............. | 705/10 |

* cited by examiner

Primary Examiner—Andrew J. Fischer
Assistant Examiner—Murali Dega
(74) Attorney, Agent, or Firm—Townsend and Townsend and Crew LLP (57) ABSTRACT

A system for providing real-time risk mitigation for an authorization system. The system receives authorization requests from multiple merchants (or their respective acquirers) and processes such requests. Each processed request is then forwarded to its corresponding issuer for further authorization. Each processed request includes an authorization message. The authorization message can include a risk score, a number of reason codes, and a number of condition codes. The use of the risk score, reason codes and condition codes allows issuers to make better informed decisions with respect to providing authorizations.

33 Claims, 5 Drawing Sheets

Message Layout

| Vertical Fraud Account Level Risk | | | Horizontal Risk Schemes | | | | | | |
|---|---|---|---|---|---|---|---|---|---|
| Risk Score | | Reason Code 1 | Reason Code 2 | Condition Code 1 | | Condition Code 2 | | Condition Code 3 | |
| Byte 1 | Byte 2 | Byte 3 | Byte 4 | Byte 5 | Byte 6 | Byte 7 | Byte 8 | Byte 9 | Byte 10 |

*FIG. 5*

METHOD AND SYSTEM FOR PROVIDING RISK INFORMATION IN CONNECTION WITH TRANSACTION PROCESSING

CROSS-REFERENCES TO RELATED APPLICATIONS

This application claims the benefit of U.S. Provisional Patent Application No. 60/484,547, filed Jul. 1, 2003, entitled "Method and System for Providing Advanced Authorization," the entire disclosure of which is incorporated by reference for all purposes.

This application also incorporates by reference for all purposes the entire contents of the following:

(1) U.S. Pat. No. 6,119,103, issued Sep. 12, 2000, entitled "Financial Risk Prediction Systems and Methods Therefor;"

(2) U.S. Pat. No. 6,018,723, issued Jan. 25, 2000, entitled "Method and Apparatus for Pattern Generation;"

(3) U.S. Pat. No. 6,658,393, issued Dec. 2, 2003, entitled "Financial Risk Prediction Systems and Methods Therefor;"

(4) U.S. Pat. No. 6,598,030, issued Jul. 22, 2003, entitled "Method and Apparatus for Pattern Generation;"

(5) U.S. Patent Application Publication No. US 2002/0194503, published Dec. 19, 2002, entitled "Distributed Quantum Encrypted Pattern Generation and Scoring;" and

BACKGROUND OF THE INVENTION

The present invention generally relates to transaction processing, and more specifically to a method and system for providing risk information associated with payment card or product transactions.

There are many forms of payment cards or products, the most commonly known of which is the credit card. Other forms of payment cards or products include charge cards, debit cards, automated teller machine (ATM) cards, loyalty program cards, gift cards, and other identifiers used to receive or redeem value. In a typical payment card transaction, when a customer (e.g., an individual or business accountholder) presents a payment card to a merchant for payment, the merchant checks with the issuer (e.g., banks, credit unions, mortgage companies, and the like) of the payment card for authorization. In most instances, the issuer will first require the merchant to obtain evidence for authenticating the customer's identity at the time of the transaction, such as the customer's signature or customer's entry of a personal identification number (PIN) or password into a keypad. Authorization is then typically given by the issuer in the form of a code that indicates whether the authorization is given (i.e., whether the particular transaction is approved, declined, or referred).

There are different types of risks involved in authorizing use of a payment card. One well known type of risk is security risk, such as fraud. Security risk relates to illegitimate use of a payment card by an unauthorized person. Credit card fraud, for example, has continually been a persistent problem in the payment card industry. With the burgeoning growth of e-commerce and transactions conducted online, opportunities for payment card theft have become more readily available. As a result, online payment card fraud has also accordingly increased over the last few years. Existing industry solutions provide limited timely risk information to the transaction authorization process. Despite many prevention efforts, payment card fraud continues to account for annual losses in the range of hundreds of millions of dollars.

In addition to losses incurred due to payment card fraud, transactions lost due to false-positive declines (i.e., transactions that are incorrectly identified as fraudulent) also annually cost merchants and issuers hundreds of millions of dollars in sales.

Furthermore, existing industry solutions that combat payment card fraud tend to be account-and issuer-oriented. In other words, individual issuers may employ different solutions to detect fraudulent activities on their respective accounts and detection is at a single account level. As a result, payment card fraud that occurs across multiple accounts from multiple issuers often goes undetected. For example, it would be difficult for an individual issuer to determine that an usually high number of payment cards used at a particular merchant have been compromised and subject of fraud, since the fraud may only involve a small number of payment cards issued by that individual issuer.

Another type of risk that is associated with use of a payment card is credit risk, or the credit worthiness of the cardholder. While the payment card may be used by an authorized person, such as, the cardholder, the cardholder may not always be able to fulfill his/her incurred payment obligations. For example, a cardholder may run up a substantial amount of outstanding balance and then refuse or become unable to pay. Consequently, default or failure to pay also presents a significant problem to payment card issuers.

Moreover, risks associated with use of a payment card affect not only the cardholder and the payment card issuer. Other parties involved in the payment transaction, such as, the merchant and the acquirer (i.e., a financial institution that makes arrangements with merchants to accept credit card sales), are also affected as well. Depending on the business or payment arrangement, each party involved in the payment transaction may have to bear a portion of the loss.

Hence, it would be desirable to provide a method and system that is capable of providing a more robust transaction process in order to reduce payment card risk as well as improve the success rate of transaction verification.

BRIEF SUMMARY OF THE INVENTION

The present invention relates to real-time risk mitigation for a transaction processing system, such as a payment authorization system. In one embodiment, the system receives authorization requests from multiple merchants (or their respective acquirers) and processes such requests. Each processed request is then forwarded to its corresponding issuer for further authorization. Each processed request includes an authorization message. The authorization message includes a risk score or indicator, one or more reason codes, and one or more condition codes. The use of the risk score, reason codes, and condition codes allows issuers to make better informed decisions with respect to providing authorizations.

In one embodiment, a system for processing authorization requests for transactions is disclosed. The system includes a client device configured to issue an authorization request corresponding to a transaction, and an in-flight model component. The in-flight model component is configured to: receive the authorization request and generate an authorization message, forward the authorization message to a first party responsible for deciding the authorization request, capture a decision made by the first party with respect to the authorization request, and forward the decision to the client device for further action by a second party. The authorization message includes a risk indicator, one or more reason codes, and one or more condition codes. The authorization message is generated in real-time. In addition, all or substantially all authorization requests issued by the client device are captured and processed by the in-flight model component in real-time.

The system further includes an offline model component configured to receive the authorization request, transactional information relating to the transaction, and information relating to the decision made by the first party, generate profiling information based on the authorization request, the transactional information, the information relating to the decision and additional information, and forward at least a subset of the profiling information to the in-flight model component. The profiling information includes account profiles and event profiles. The in-flight model component uses the profiling information forwarded by the offline model component to generate future authorization messages.

The in-flight model component is further configured to use information relating to a plurality of most recent transactions to generate the future authorization messages; wherein the information relating to the plurality of most recent transactions has not yet been processed by the offline model component.

The system also includes a linkage detection component configured to generate the additional information using transaction logs, financial risk information (such as fraud information) and information relating to compromised data sets, the linkage detection component further configured to forward the additional information to the offline model component.

The first party includes at least one of an issuer, a transaction processor, and an acquirer. The second party includes a merchant. The transaction includes at least one of a credit card transaction, a debit card transaction, a loyalty program card transaction, and an ATM transaction. The client device includes at least one of a point-of-sale device, an ATM device, and a virtual terminal.

The risk indicator represents an account level risk associated with the transaction. At least one of the one or more reasons represents a factor associated with the risk indicator, and at least one of the one or more condition codes represents a horizontal risk scheme, the horizontal risk scheme involving a number of accounts.

In an alternative embodiment, an authorization system is disclosed. The system includes control logic configured to receive an authorization request for a corresponding transaction from a client device; control logic configured to generate an authorization message for the authorization request in real-time using a first set of profiling information, the authorization message comprising a risk score; control logic configured to forward the authorization message to a party responsible for deciding the corresponding payment transaction; and control logic configured to capture a decision made by the party with respect to the corresponding payment transaction and forward the decision to the client device.

The system further includes control logic configured to capture and process the authorization request, the authorization message, information relating to the corresponding transaction and information relating to the decision to generate a second set of profiling information; and control logic configured to update the first set of profiling information with at least a subset of the second set of profiling information. The second set of profiling information is generated offline.

The authorization message further comprises one or more reason codes and one or more condition codes. The risk score represents an account level risk associated with the corresponding transaction. At least one of the one or more reasons represents a factor associated with the risk score, and at least one of the one or more condition codes represents a horizontal risk scheme, the horizontal risk scheme involving a plurality of accounts.

The transaction includes at least one of a credit card transaction, a debit card transaction, a loyalty program card transaction, and an ATM transaction. The client device includes at least one of a point of sale device, an ATM device, and a virtual terminal. The party includes an issuer.

It should be understood that in alternative embodiments of the present invention, the system is able to accommodate multiple parties including a number of merchants, acquirers, and issuers.

The foregoing, together with other features, embodiments, advantages of the present invention, will become more apparent when referring to the following specification, claims, and accompanying drawings.

DETAILED DESCRIPTION OF THE INVENTION

The present invention in the form of one or more exemplary embodiments will now be described. In one exemplary embodiment, a system is provided that empowers an authorization process by delivering real-time risk mitigation information based on collective intelligence to better inform relevant parties, such as, merchants, acquirers, and issuers, thereby improving authorization decisions. For example, the system can be used by a payment card service association, such as Visa, to provide better risk mitigation services (such as, fraud detection) to its members. In alternative embodiments, the present invention can be deployed as part of a system which processes transactions where risk information associated with the transactions is provided for evaluation purposes. Based on the disclosure and teachings provided herein, a person of ordinary skill in the art will appreciate other ways and/or methods to deploy the present invention.

In one embodiment, the system of the present invention is able to evaluate all or substantially all of the authorization requests received from multiple merchants (or their respective acquirers). "Substantially all" means a significant percentage (e.g., 90-99%). Furthermore, the evaluation is performed in-flight as part of the authorization process thereby minimizing impact on the authorization process. The architecture of the system that allows it to evaluate every authorization request in-flight is based upon a distributed environment. The distributed environment utilizes a hybrid approach or infrastructure which combines multiple risk evaluation technologies across separate platforms. This architecture is designed to take advantage of the strengths of different techniques so as to maximize the accuracy and robustness of various risk evaluation and/or fraud detection models.

Figure 1:
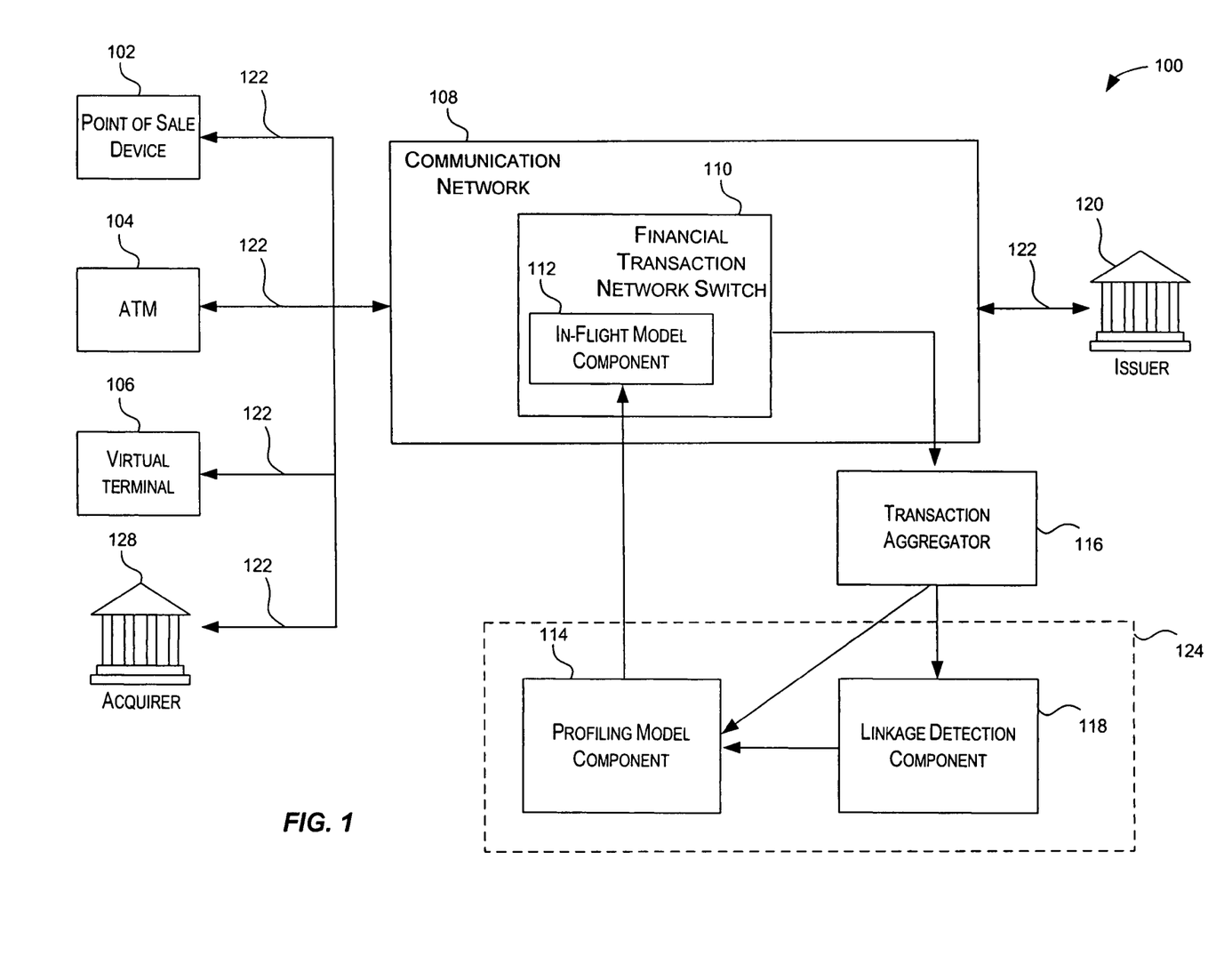
FIG. 1 is a simplified block diagram illustrating an exemplary embodiment of the present invention.

FIG. 1 is a simplified block diagram illustrating the architecture of an advanced authorization system 100 incorporating an embodiment of the present invention. Advanced authorization system 100 includes a number of client devices, such as point of sale (POS) device 102, Automated Teller Machine (ATM) device 104, virtual terminal 106, issuer 120, and acquirer 128. Virtual terminal 106, as used herein, is any computer system configured to process a customer order received over a network, such as the Internet. In fact, any device used to facilitate payment transactions by accepting payment card information can be a client device in advanced authorization system 100.

Client devices request information from a server computer system, such as financial transaction network switch 110, which provides the relevant financial transaction information. For this reason, servers typically have more computing and storage capacity than client devices. However, a particular computer system may act as both a client or a server depending on whether the computer system is requesting or providing information. Additionally, although the invention has been described as using a client-server environment, it should be apparent that the invention may also be embodied in a stand-alone computer system.

Each client device is coupled to a communication network 108 via a plurality of communication links 122. Communication network 108 provides a mechanism for allowing the various components of advanced authorization system 100 to communicate and exchange information with each other. In one embodiment, financial transaction network switch 110 is implemented as a component of a communication network 108. For example, communication network 108 can be the VisaNet network, an existing global clearing and settlement system provided by Visa. In an alternative embodiment, financial transaction network switch 110 can be implemented external to communication network 108 and be coupled to client devices via communication network 108.

Communication network 108 may itself be comprised of many interconnected computer systems and communication links. Communication links 122 may be hardwire links, optical links, satellite or other wireless communications links, wave propagation links, or any other mechanisms for communication of information. Various communication protocols may be used to facilitate communication between the various elements shown in FIG. 1. These communication protocols may include TCP/IP, HTTP protocols, wireless application protocol (WAP), vendor-specific protocols, customized protocols, and others. In embodiments of the present invention, communication network 108 may be any suitable communication network including the Internet, a local area network (LAN), a wide area network (WAN), a wireless network, an intranet, a private network, a public network, a switched network, combinations thereof, and the like.

According to an embodiment of the present invention, advanced authorization system 100 is responsible for facilitating authorization of a payment transaction initiated at a client device relating to a payment card (e.g., credit card, ATM card, debit card, or gift card). Advanced authorization system 100 provides the issuer of the payment card with information related to the requested transaction, as well as real-time risk mitigation information based on collective intelligence. The real-time risk mitigation information allows an issuer to make a more informed decision with respect to a payment transaction, thereby minimizing a risk associated with the transaction. The issuer's authorization response to the requesting client device is relayed by advanced authorization system 100 via communication network 108.

Advanced authorization system 100 uses a hybrid approach for risk mitigation that incorporates multiple modeling technologies and distributes them across two platforms, namely, an online component (including in-flight model component 112) and an offline component 124 (including profiling model component 114 and linkage detection component 118). By virtue of the fact that multiple technologies are combined, the hybrid approach provides much greater flexibility in architecture, allowing for distribution across platforms and environments. To accommodate distribution, the hybrid infrastructure relies on utilizing standard components and interface technologies that provide for easy integration and facilitate the development and implementation of hybrid modeling techniques. In one implementation, the hybrid infrastructure utilizes standards such as XML, an open data exchange standard, and PMML, a modeling version of XML that enables the definition and sharing of predictive models between applications.

In one embodiment, advanced authorization system 100 deploys hybrid technology on the online transaction-processing platform to handle in-flight risk evaluation for all authorization requests received from the multiple merchants (and their respective acquirers). Software modules executing on financial transaction network switch 110 use hybrid predictive modeling to generate a risk indicator and risk reasons for each authorization request. The predictive modeling is performed based on a number of input parameters including, for example, information relating to the requested transaction, recent transaction histories (e.g., working profiles), and one or more input profiles (such as account and event profiles). Additional details relating to predictive modeling are further described in U.S. Pat. Nos. 6,119,103, 6,018,723, 6,658,393, and 6,598,030.

These input profiles are generated by and/or updated software modules executing on one or more offline transaction-processing platforms. The offline transaction-processing platforms use a combination of both neural networks and decision tree modeling techniques. The offline transaction-processing platforms permit more extensive analytics to be performed on a larger set of historical data (such as aggregate transaction histories, public records, CAMS, and other available data stores) without impacting the ability to deliver real-time risk indicators or risk reasons. The offline transaction-processing platforms periodically update (for example, once every, ten minutes, one hour, one day, one week, or one month, etc.) the one or more predetermined profiles used for real-time risk mitigation, as well as provide the condition codes. Offline transaction-processing platforms may be locally coupled to financial transaction network switch 110 or may be distributed across advanced authorization system 100 and accessed by financial transaction network switch 110 via communication network 108.

During a payment transaction, a merchant (or its acquirer) or an accountholder at a client device initiates an authorization request. The authorization request is issued to the corresponding issuer seeking information that can be used to act on the payment transaction. The authorization request includes information relating to the prospective transaction, such as account number, amount of transaction, and location. In alternative embodiments of the present invention, the authorization request can additionally include merchant category, payment card type, transaction type, IP address, email address, stock keeping unit (SKU) numbers, or price per good or service to be purchased. In fact, as alternative embodiment, any information captured at the point of sale can be included in an authorization request. Based on the disclosure and the teachings provided herein, a person of ordinary skill in the art will appreciate what types of information can be included in the authorization request.

This authorization request is transmitted to financial transaction network switch 110 over communication network 108. In response to an authorization request, the financial transaction network switch 110 generates an authorization message.

In one embodiment, financial transaction network switch 110 uses a hybrid model approach in order to quickly generate the authorization message using collective information. The collective information is in the form of one or more databases or data stores (such, account, working, and event profiles). In many practical applications of the present invention, financial transaction network switch 110 cannot introduce substantial delays in transaction processing, which could inconvenience both merchants and accountholders. Therefore, in some instances, financial transaction network switch 110 according to an embodiment of the present invention may need to process about 5,000 to 10,000, or more authorization requests per second.

The authorization message includes one or more in-flight risk indicators. In one exemplary implementation, the in-flight risk indicator is a numerical score (or a risk score); alternatively, the in-flight risk indicator may include other types of information, such as, text. Based on the disclosure and teachings provided herein, a person of ordinary skill in the art will appreciate how to implement the in-flight risk indicator. In addition to the risk indicator, the authorization message also includes a number of reason codes to provide a description of the model logic behind the risk indicator and/or a number of condition codes that are used to indicate risk conditions. A reason code may indicate, among other things, that the requested transaction is located in a high risk country, related to a compromised account, or fits an unusual pattern. A condition code states a risk condition as it relates to a transaction, an account, and/or an accountholder. For example, some of these risk conditions relate to compromised accounts and/or other rare events (such as identity theft, bankruptcy, and large fraud run on a compromised account). In one embodiment of the present invention, linkage detection component 118 determines condition codes directly from public records, compromised account management system (CAMS), or other data sources prior to the authorization request, and these conditions codes are relayed as part of the authorization message to issuer 120 by financial transaction network switch 110.

Figure 5:
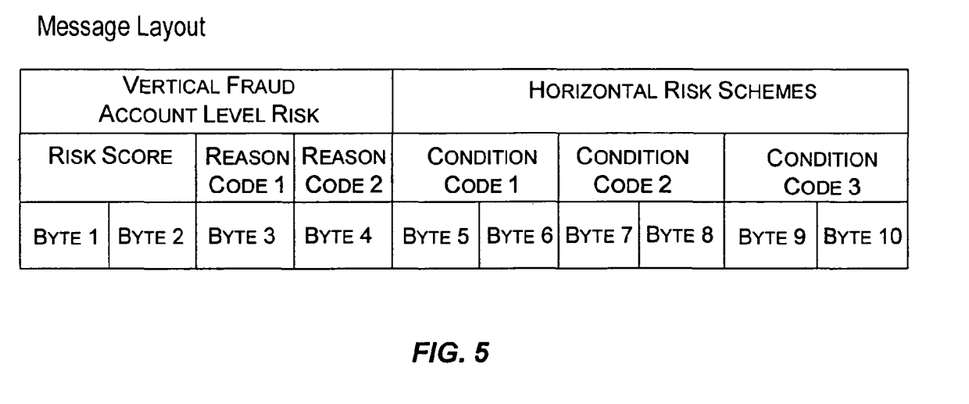
FIG. 5 is an exemplary format of an authorization message generated by a system according to one exemplary embodiment of the present invention.

FIG. 5 is an exemplary format of the authorization message generated by the system 100. The authorization message includes a risk score, one or more reason codes, and one or more condition codes. An authorization message can also include information relating to the requested transaction, such as an account identifier, transaction amount, location identifier, and merchant identifier. Based on the disclosure and teachings provided herein, a person of ordinary skill in the art will know how to select the appropriate data fields for the authorization message, and include the appropriate number of reason and condition codes for a specific application. The authorization message is forwarded to the appropriate issuer. The issuer can use the information provided by the authorization message (along with the issuer's account information) to determine whether to authorize the requested transaction.

The authorization message is next transmitted by financial transaction network switch 110 to the appropriate issuer 120 via communication network 108. The issuer 120 then uses information provided by the authorization message (along with other information maintained by issuer 120, such as, the issuer's own account information) to determine whether to authorize the requested transaction. Additionally, issuer 120 may itself use predictive risk models to further analyze the requested transaction. The determination made by issuer 120 with respect to the authorization message is then transmitted to financial transaction network switch 110.

Financial transaction network switch 110 relays the authorization message to the corresponding merchant (or its acquirer) or accountholder. If the payment transaction is approved by issuer 120, the requested transaction can be consummated at the client device. On the other hand, if the payment transaction is denied by issuer 120, the requested transaction is canceled. As an embodiment of the present invention, system 100 can provide the merchant (or its acquirer) or accountholder with the basis for the denial such as the risk reason or condition code, or even the risk score in appropriate circumstances.

Transaction aggregator 116 captures and stores authorization messages and corresponding information relating to determinations made by issuers 120 in response to the authorization messages. The information from the determinations made by the issuers 120 is used as feedback to allow the system 100 to further improve the content accuracy of future authorization messages. Such authorization messages and corresponding information can be evaluated using selected criteria for various analytical purposes. For example, authorization messages and corresponding information relating to a particular merchant may be analyzed. The analysis results are then provided to the acquirer having business arrangement with that particular merchant to allow the acquirer to determine whether there are problematic activities with that particular merchant. For instance, if authorization messages with risk indicators indicating high risk are regularly generated for transactions originating from that particular merchant, the acquirer may be alerted to take preventive actions with respect to that merchant to minimize fraudulent activities. As it will be appreciated, the system 100 is able to identify possible fraudulent activities originating from a single merchant but occurring across multiple accounts. Hence, potentially problematic merchants can be identified to their respective acquirers.

In another situation, authorization messages and corresponding information relating to a particular accountholder may be analyzed. The analysis results are then provided to a merchant doing business with that particular accountholder to allow the merchant to determine whether additional precautionary measures should be undertaken when conducting business with that particular accountholder. In some cases, even though authorization for a transaction is given, it might be prudent to employ additional precautionary measures for additional assurance. For instance, if authorization messages with risk indicators indicating high risk are regularly generated for transactions originating from that particular accountholder, the merchant may be alerted to take additional preventive actions with respect to that accountholder to minimize fraudulent activities. Similarly, as will be appreciated, potentially problematic accountholders can be identified to their respective merchants.

The advanced authorization system 100 depicted in FIG. 1 is merely illustrative of an embodiment incorporating the present invention and does not limit the scope of the invention as recited in the claims. One of ordinary skill in the art would recognize other variations, modifications, and alternatives. For example, more than one issuer 120 may be coupled to communication network 108. As another example, a plurality of client devices may be coupled to communication network 108 via an agent system (not shown) or via some other server system.

Figure 2:
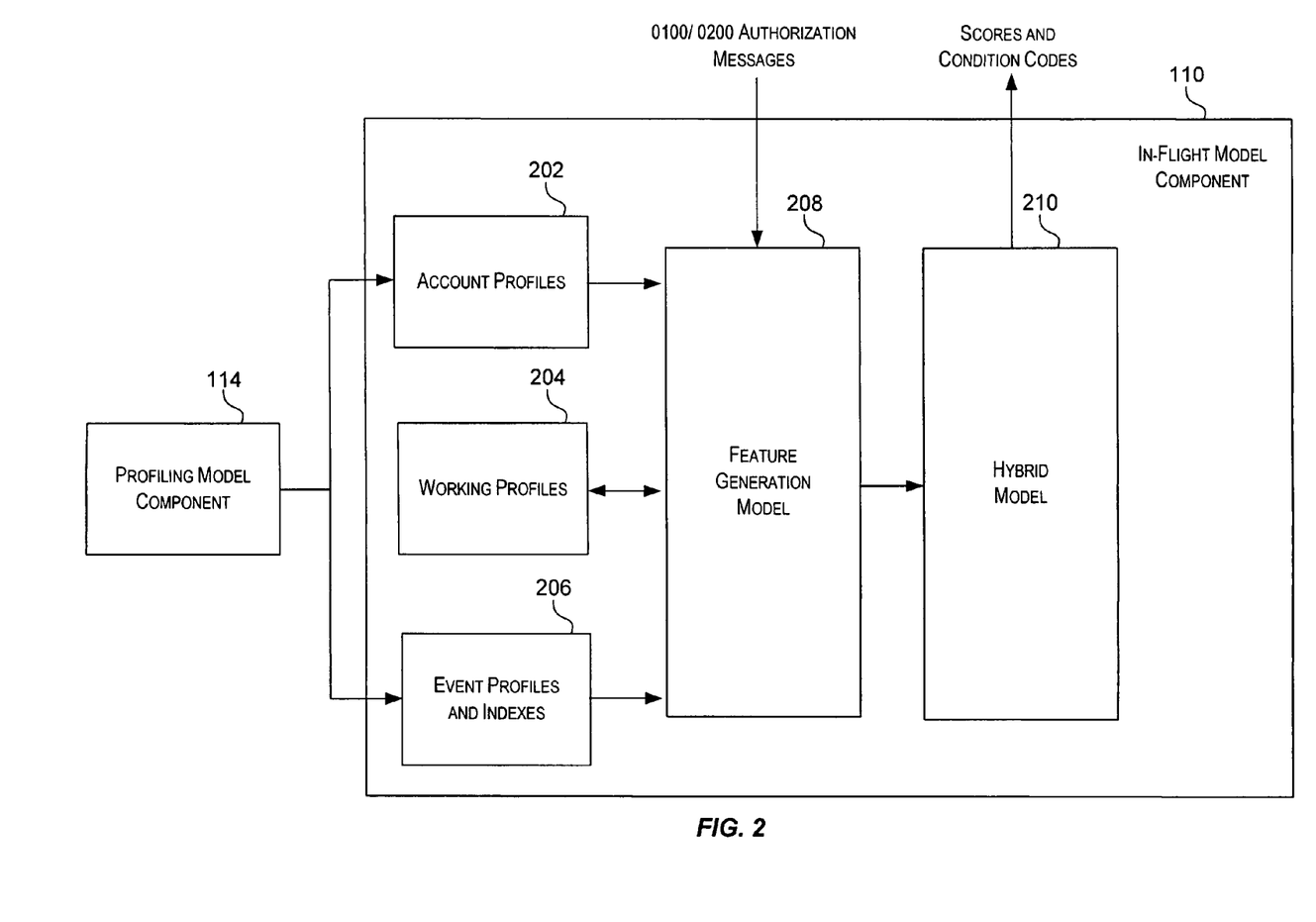
FIG. 2 is a simplified block diagram illustrating an exemplary embodiment of an in-flight model component of a financial transaction network switch.

FIG. 2 is simplified block diagram illustrating an exemplary embodiment of an in-flight model component 112 of the financial transaction network switch 110. In-flight model component 112 is designed to score every authorization request received from client devices using, for example, treeand rule-based technology. In one implementation, given the diversity of data processed through in-flight model component 112, advanced decision tree and boosting technologies are used to assure more accurate risk evaluation and fraud detection.

In-flight model component 112 evaluates the requested transaction using data provided by data stores, such as account profiles 202, working profiles 204, and event profiles and indexes 206. In one embodiment, feature generation model 208 generates features for keys associated with the authorization request and a series of values associated with these keys. The values may include, but are not limited to, probabilities associated with the keys. A key is a structure used to group information from a transaction profile record. For instance, a key can represent an account number, an individual transaction within the account, location, issuer, amount, or status fields within a transaction. Additional details relating to feature generation are further described in U.S. Patent Application Publication No. U.S. 2002/0194503, published Dec. 19, 2002.

These features and values, or feature vectors, generated by feature generation model 208 are outputted to hybrid model 210. Hybrid model 210 calculates risk average ratios for each key type (for example, account number, location, issuer, an individual transaction). The risk ratios are statistical measurements of relative risks of each key instance. The risk ratios are used as one component in determining the in-flight risk indicator, or risk score, along with other factors such as transaction history and event-level data sources. Conventional statistical techniques using the risk ratios can also be used to determine dominant features or clustered features to generate reason codes.

In one embodiment, account profiles 202 contain information related to individual consumer accounts, such as account number, most recent transactions, time of most recent transaction, and lags. However, in other embodiments, account profile may contain any information related to an account that may be useful in evaluating risk associated with such account, such as current balance, credit limit, or other information maintained by an issuer. Account profiles 202 are provided by profiling model component 114, which is part of an offline transaction-processing platform. Profiling model component 114 periodically updates the account profiles 202, for example, once every ten minutes, one hour, one week day, or one month. By providing the online transaction-processing platform periodically with updated information, the system 100 is able to process the authorization requests with better accuracy. In one embodiment, for accounts identified as having a high risk, profiles can be updated more frequently. Alternatively, account profiles 202 may only contain the long-term profiles of those accounts identified as the riskiest.

Similarly, profiling model component 114 provides in-flight model component 112 with periodic updates to event profiles and indexes 206. Event profiles and indexes 206 are tables providing information relating to rare events and compromised accounts. For example, these tables may contain, without limitation, location, merchant, merchant category, zip code, time period and exception information. Examples of exception information include confirmed fraud information, transaction dispute information, credit information, and other financial risk information. Event profiles and indexes 206 can be used to help determine the impact of rare events on accounts across a plurality of issuers. For example, event profiles and indexes 206 may identify payment cards used at particular merchant during a specified period of time that have a high risk of being compromised.

In addition, in-flight model component 112 maintains working profiles 204, short-term histories (to account for the time lag between when the risk score is issued and when account and event profiles 202 and 206 are updated by the offline transaction processing platform). In this way, in-flight model component 112 can take into account recent transactions not yet processed by the offline transaction-processing platforms. In one embodiment, working profiles 204 may contain the previous ten minutes of transactions. Alternatively, working profiles 204 may only contain the previous ten minutes of transaction involving the riskiest accounts. Based on the disclosure and teachings provided herein, a person of ordinary skill in the art will appreciate the types of transactions that can be included in the working profiles 204.

Figure 3:
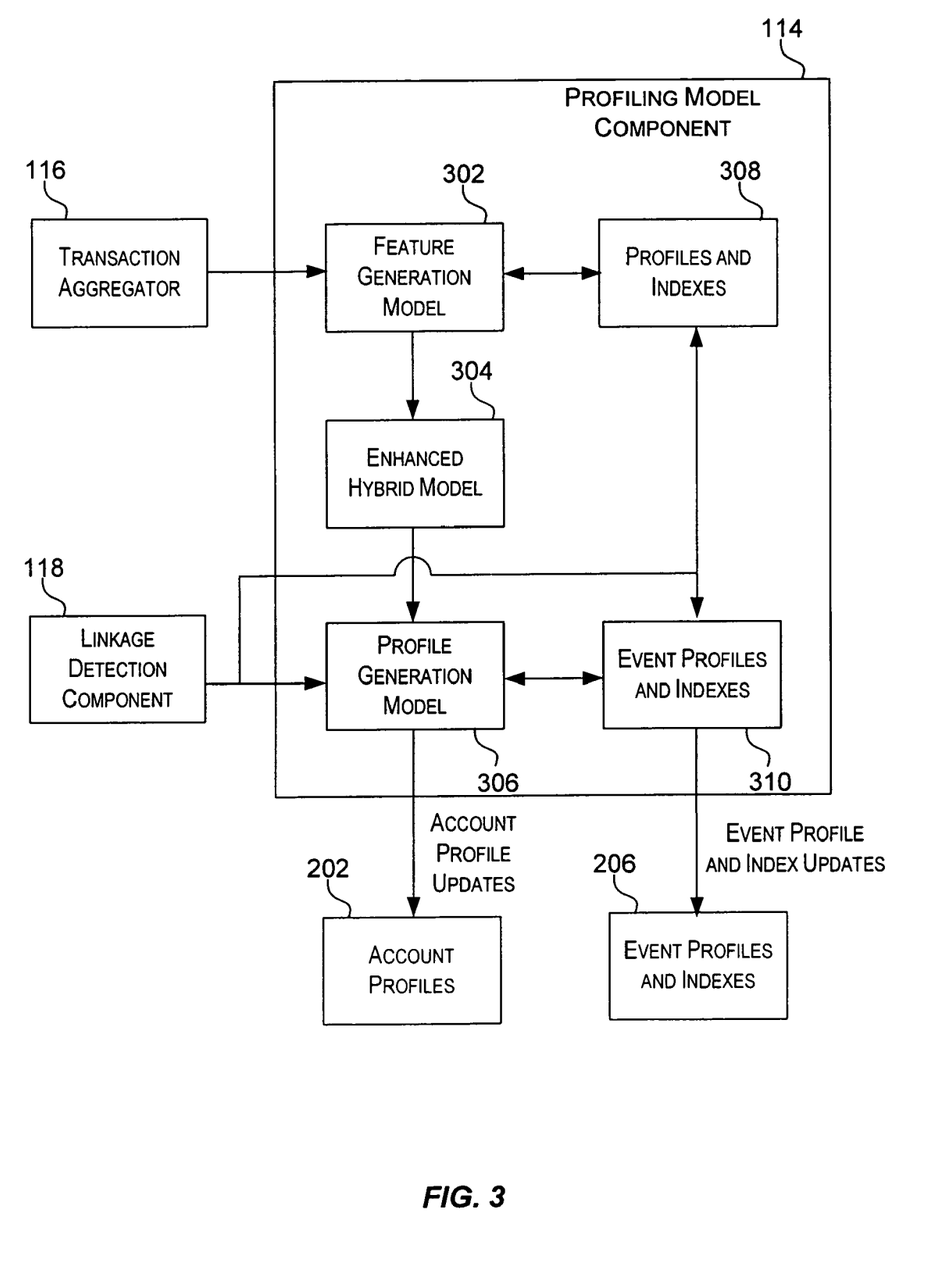
FIG. 3 is a simplified block diagram illustrating an exemplary embodiment of a profiling model component.

FIG. 3 is a simplified block diagram illustrating an exemplary embodiment of a profiling model component 114. In one embodiment, feature generation model 302 generates features for keys associated with previous payment transactions provided by transaction aggregator 116 and a series of values associated with these keys. The values may include, but are not limited to, probabilities associated with the keys. Additional details relating to feature generation are further described in U.S. Patent Application Publication No. U.S. 2002/0194503, published Dec. 19, 2002.

These features and values, or feature vectors, generated by feature generation model 302 are outputted to the enhanced hybrid model 304. Enhanced hybrid model 304 calculates risk average ratios for each key type (for example, account number, location, issuer, an individual transaction). The risk ratios are statistical measurements of relative risks of each key instance. The risk ratios, along with other transaction information, are used as one component in determining the in-flight risk indicator, or risk score, as well as the reason codes.

Figure 4:
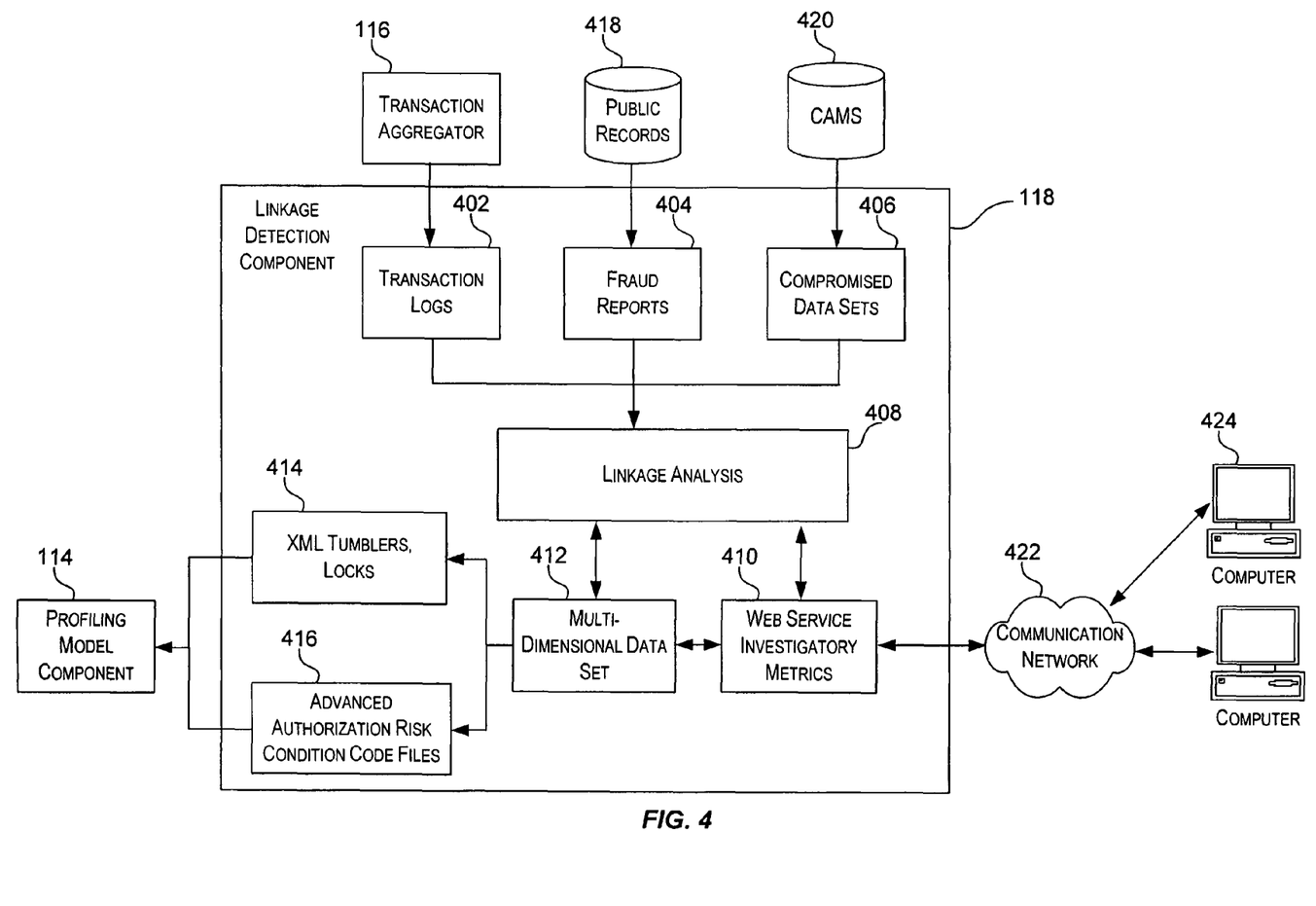
FIG. 4 is a simplified block diagram illustrating an exemplary embodiment of a linkage detection component.

Tumblers and locks generated by linkage detection component 118 are used by profile generation model 306. Tumbler and locks are the rules to create features in the profiling models. For example, a lock structure is used to control the processing of a key. Each lock performs one specific function, for example a given lock might just append data onto a key and nothing else. A lock can also perform hashing, or encryption on a key, as well as create new keys. A probability threshold may be associated with a lock. The probability threshold is used to restrict the lock operation in use of the tumbler. If the probability value of a tumbler element does not meet the threshold of the lock, the element is ignored. A tumbler is an n-ary tree structure pre-configured with input key matches pre-encrypted and compressed. The n-ary tree structure is chosen for the benefit of improved search time performance. There is one tumbler tree for each lock. Periodic (e.g., every ten minutes) updates of tumblers and locks are provided to profile generation model 306, profiles and indexes 308, and event profiles and indexes 310. Additional details relating to locks and tumblers are further described in U.S. Patent Application Publication No. U.S. 2002/0194503, published Dec. 19, 2002.

To keep the real-time, online platform current, the profiling model component 114 provides periodic updates to the profiles on the online platform (e.g., account and event profiles 202 and 206). In one embodiment, account profiles for the riskiest set of accounts are updated periodically, for example, every 10 minutes, as the offline platform receives and incorporates recent transaction data. Information regarding rare events and compromised accounts are uploaded on a regular, for example, daily, basis.

FIG. 4 is a simplified block diagram illustrating an exemplary embodiment of linkage detection component 118, also known as REDI, which is designed to identify rare events. With reference to FIG. 4, transaction aggregator 116 periodically, for example, every ten minutes, sends a feed of a predetermined amount, for example, the last 10 minutes, of transaction data to transaction logs 402. Linkage detection component 118 then incorporates this transaction data, which includes the issuer determinations and the outgoing risk scores provided to these issuers, with data from other systems, such as, fraud reports 404 and compromised data sets 406, into profile and feature updates. Fraud reports 404 represent information relating to accounts identified by public records (such as police reports) or issuers as having been stolen or subject to fraud. Compromised data sets 406 contain information provided by the Compromised Account Management System (CAMS) 420.

Linkage detection component 118 includes a set of general purpose models based on both decision tree and neural network technology to correlate anomalous behaviors. These models leverage a larger and deeper set of data in terms of both the amount of history and the breadth of data elements and features than the in-flight model component 112 by incorporating fraud reports 404 and compromised data sets 406. Additionally, models used in linkage detection component 118 also take advantage of their position in the authorization process by incorporating transaction data (e.g., transaction logs 402) that is not available at the time the authorization request is originally evaluated, such as the issuer's decision and the outgoing risk indicator. Tumblers and locks generated by linkage analysis 408 are stored in XML tumblers and locks 414 and used by profiling model component 114.

Web service investigatory metrics 410 provide access to information relating to high risk accounts in a user friendly format, such as via a web browser. Examples of web browsers include the Internet Explorer browser program provided by Microsoft Corporation, and the Netscape browser provided by Netscape Communications Corp., and others. In alternative embodiments, web service investigatory metrics 410 may also provide filtering and sorting of high risk accounts by keys or features. Computers 424 access web service investigatory metrics 410 via communication network 422. Communication network 422 may be any suitable communication network including the Internet, a LAN, a WAN, a wireless network, an intranet, a private network, a public network, a switched network, combinations thereof, and the like. Investigators using computers 424 can conduct investigations on high risk accounts and further refine linkage analysis 408. For example, linkage analysis 408 may determine whether accounts used at a particular merchant during a time period were compromised. With this information, the investigator can contact the particular merchant to determine whether accounts used prior to the specified time period have also been compromised.

Linkage analysis 408 creates advanced authorization risk condition code files 416. Advanced authorization risk condition code files 416 include condition codes for accounts that have been identified as problematic. For example, accounts identified by fraud reports 404 are associated with condition codes. One condition code may indicate that a payment card has been stolen, while another condition code could indicate a payment card is linked to a compromised card. In one embodiment, condition codes remain unaltered by profiling model component 114 and financial transaction network switch 110, and thus the original condition codes are provided to the issuer 120.

Linkage analysis 408 also generates multi-dimensional data set 412. Multi-dimensional data set 412 contains event profile information, known fraudulent activities information, accounts linked directly or indirectly to fraudulent activities, high risk activities (such as transactions in a high risk country), and testing and non-loss probing data sets (such as single ping fraud information), as well as other information.

While the foregoing description relates to a credit card payment transaction, it should be understood by a person of ordinary skill in the art that the present invention can be applied to other types of payment cards (such as debit cards, ATM cards, charge cards, loyalty program card, or gift cards) or product transactions to mitigate risks associated with payment authorizations. In fact, techniques of the present invention can be applied to any payment arrangement wherein there exists a need to generate a risk score or risk reasons.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited in this patent are hereby incorporated by reference for all purposes.

What is claimed is:

1. A system for processing authorization requests for transactions, comprising:
   a client device of a first party configured to issue a plurality of authorization requests, each authorization request corresponding to a transaction of an account; and
   an in-flight model component configured to:
   receive at least a subset of prior profiling information at a first predetermined time to update current profiling information of the account,
   receive each authorization request and respectively generate an authorization message at a non-predetermined time after the first predetermined time, the authorization message being at least partially based on the current profiling information,
   forward the authorization message to a first party responsible for deciding the authorization request,
   capture a decision made by the first party with respect to the authorization request,
   forward the decision to the client device for further action by a second party, and
   receive at least a subset of new profiling information at a second predetermined time after the first and non-predetermined times to update the current profiling information;
   wherein the authorization message comprises a risk indicator;

wherein the authorization message is generated in real-time; and
wherein all or substantially all authorization requests issued by the client device are captured and processed by the in-flight model component in real-time,
wherein the first party includes an issuer, and
wherein the second party includes a merchant,
wherein the system further comprises
an offline component configured to:
  generate the prior profiling information, and send at least the subset of the prior profiling information to the in-flight model component at the first predetermined time,
  receive the authorization request, transactional information relating to the transaction, and information relating to the decision made by the first party,
  generate the new profiling information based on the authorization request, the transactional information, and the information relating to the decision, and
  forward at least the subset of the new profiling information to the in-flight model component at the second predetermined time,
wherein the in-flight model component uses at least the subset of the new profiling information forwarded by the offline component to generate future authorization messages,
wherein the in-flight model component is further configured to use short-term historical information relating to a plurality of most recent transactions of the account, the most recent transactions being performed after the first predetermined time and before the non-predetermined time; and
wherein the short-term historical information relating to the plurality of the most recent transactions was not considered by the offline component to generate the prior profiling information.

2. The system of claim 1 wherein the authorization message further comprises one or more reason codes.

3. The system of claim 1 wherein the authorization message further comprises one or more condition codes.

4. The system of claim 1 wherein the current profiling information includes account profiles and event profiles.

5. The system of claim 1 further comprising:
a linkage detection component having respective software configured to generate the additional information using transaction logs, financial risk information, and information relating to compromised data sets, the linkage detection component further configured to forward the additional information to the offline component.

6. The system of claim 1 wherein the transaction includes at least one of a credit card transaction, a debit card transaction, loyalty program card transaction, and an ATM transaction.

7. The system of claim 1 wherein the client device includes at least one of a point-of-sale device, an ATM device, and a virtual terminal.

8. The system of claim 1 further comprising:
a financial transaction network switch, wherein the in-flight model component resides on the financial transaction network switch.

9. The system of claim 1 wherein the authorization message comprises one or more reason codes and one or more condition codes, and wherein the risk indicator represents an account level risk associated with the transaction;
  wherein at least one of the one or more reasons represents a factor associated with the risk indicator; and
  wherein at least one of the one or more condition codes represents a horizontal risk scheme, the horizontal risk scheme involving a plurality of accounts.

10. A computer implemented method for processing an authorization request for a transaction, the method comprising:
  receiving the authorization request from a first party over a communication network;
  generating, using an online component of a hybrid infrastructure, an authorization message for the authorization request in real-time using a set of profiling information, the authorization message having a risk score;
  providing over the communication network the authorization message to a second party responsible for deciding the authorization request;
  receiving an authorization response from the second party; and
  providing the authorization response to the first party,
  wherein the first party is a merchant and the second party is an issuer, and wherein the method further comprises
  capturing and storing the authorization request, the authorization message, the authorization response and transactional information relating to the transaction,
  generating, using an offline component of the hybrid infrastructure, a second set of profiling information using the stored authorization request, authorization message, authorization response and transactional information relating to the transaction, wherein the second set of profiling information is generated offline, and
  updating the set of profiling information with at least a subset of the second set of profiling information in a periodic manner,
  wherein the set of profiling information includes a working profile which is maintained in real-time according to short-term historical information relating to a plurality of most recent transactions,
  wherein the most recent transactions occur after a most recent update of the set of profiling information and before a subsequent update according to the periodic manner; and
  wherein the short-term historical information relating to the plurality of the most recent transactions is not considered when generating the most recent update of the profiling information.

11. The method of claim 10 wherein the risk score identifies an account level risk for the transaction.

12. The method of claim 10 wherein the authorization message further includes one or more reason codes and one or more condition codes;
  wherein at least one of the one or more reason codes represents a factor associated with the risk score; and
  wherein at least one of the one or more condition codes represents a horizontal risk scheme, the horizontal risk scheme involving a plurality of accounts.

13. The method of claim 10 wherein the transaction includes at least one of a credit card transaction, a debit card transaction and an ATM transaction.

14. A computer implemented method for processing authorization requests, the method comprising:
  receiving a plurality of authorization requests corresponding to a plurality of transactions respectively from a first plurality of parties;
  generating, using an online component of a hybrid infrastructure, a plurality of authorization messages respectively the plurality of authorization requests in real-time using a set of profiling infoiination, the authorization message having a risk score;

forwarding the plurality of authorization messages respectively to a second plurality of parties responsible for deciding the plurality of authorization requests;

receiving a plurality of authorization responses corresponding to the plurality of authorization requests respectively from the second plurality of parties; and providing the plurality of authorization responses to the first plurality of parties, wherein the first plurality of parties includes at least one of a merchant and an acquirer; and wherein the second plurality of parties include a plurality of issuers, capturing and storing information relating to the plurality of authorization requests, the plurality of authorization messages, the plurality of authorization responses and the plurality of transactions;

generating, using an offline component of the hybrid infrastructure, a second set of profiling information using the stored information, wherein the second set of profiling information is generated offline; and updating the set of profiling information with at least a subset of the second set of profiling information in a periodic manner, wherein the set of profiling information is maintained in real-time with short-term historical information relating to a plurality of most recent transactions which occur after updating the set of profiling information in the periodic manner; and wherein the short-term historical information relating to the plurality of the most recent transactions is not considered when generating the second set of profiling information.

15. The method of claim 14 wherein the second set of profiling information includes a testing data set.

16. The method of claim 14 wherein the risk score identifies an account level risk for the corresponding transaction.

17. The method of claim 14 wherein the authorization message further includes one or more reason codes and one or more condition codes;
  wherein at least one of the one or more reason codes represents a factor associated with the risk score; and
  wherein at least one of the one or more condition codes represents a horizontal risk scheme, the horizontal risk scheme involving a plurality of accounts.

18. The method of claim 14 wherein the plurality of transactions include at least one of a credit card transaction, a debit card transaction, a loyalty program card transaction, and an ATM transaction.

19. The method of claim 10 wherein the authorization message comprises an account identifier and a transaction amount.

20. The system of claim 1 wherein any authorization requests issued by the client device that are not captured and processed by the in-flight model component in real-time are forwarded to the first party responsible for deciding the authorization request.

21. The system of claim 1 wherein the authorization message comprises an account identifier, a transaction amount, a location identifier, and a merchant identifier.

22. The method of claim 10 wherein the authorization message comprises an account identifier, a transaction amount, a location identifier, and a merchant identifier.

23. The method of claim 17 wherein the authorization message comprises an account identifier, a transaction amount, a location identifier, and a merchant identifier.

24. The method of claim 14 wherein the authorization message comprises an account identifier, a transaction amount, a location identifier, and a merchant identifier.

25. The system of claim 1 wherein the offline component comprises decision trees and neural networks.

26. The system of claim 1 wherein the offline component is further configured to identify whether the account is a high-risk account in order to determine a time period between the first and second predetermined times.

27. The system of claim 26 wherein the offline component is further configured to set the time period to be relatively short for high-risk accounts as compared to non-high-risk accounts.

28. The system of claim 1 wherein the short-term historical information maintained by the in-flight model component in a working profile of the account.

29. The system of claim 26 wherein the time interval is made relatively short by the control logic for high-risk accounts as compared to a non-high-risk account.

30. The method of claim 10 further comprising:
  identifying whether the authorization request is associated with a high-risk account in order to adjust a time period between the most recent update of the set of profiling information and the subsequent update.

31. The system of claim 30 wherein the time period is shortened for high-risk accounts.

32. The method of claim 17 further comprising:
  identifying whether each of the authorization requests is associated with a high-risk account in order to adjust a time period according to the periodic manner.

33. The system of claim 32 wherein the time period is shortened for high-risk accounts.

* * * * *